United States Patent [19]

Yoshida

[11] 3,754,922

[45] Aug. 28, 1973

[54] LIGHT SENSITIVE TWO-COMPONENT DIAZOTYPE MATERIAL

[75] Inventor: Shigeaki Yoshida, Yokohama, Japan

[73] Assignee: Kabushiki Kaisha Ricoh, Tokyo, Japan

[22] Filed: Aug. 17, 1971

[21] Appl. No.: 172,581

Related U.S. Application Data

[63] Continuation-in-part of Ser. No. 777,494, Nov. 20, 1968, abandoned.

[30] Foreign Application Priority Data

Nov. 25, 1967 Japan .............................. 42/75543

[52] U.S. Cl. .................................... 96/91 R, 96/49

[51] Int. Cl. ............................................ G03c 1/60

[58] Field of Search ............................ 96/91.75, 49

[56] References Cited

UNITED STATES PATENTS

| | | | |
|---|---|---|---|
| 3,169,067 | 2/1965 | Berman et al. | 96/49 |
| 3,016,298 | 1/1962 | Sanders et al. | 96/91 R X |
| 1,870,930 | 8/1932 | Sprongerts | 96/91 R |
| 2,495,827 | 1/1950 | Slifkin | 96/91 R |
| 2,551,133 | 5/1951 | Bradshaw et al. | 96/91 R |
| 2,727,820 | 12/1955 | Botkin et al. | 96/91 R X |
| 2,755,185 | 7/1956 | Sulich et al. | 96/91 R X |
| 2,829,976 | 4/1958 | Tomanek | 96/91 R |
| 3,203,803 | 8/1965 | Habib et al. | 96/91 R |
| 3,353,984 | 11/1967 | Landaw | 96/91 R X |
| 2,354,088 | 5/1944 | Reichel | 96/91 R |
| 3,460,943 | 8/1969 | Welch | 96/91 R X |

FOREIGN PATENTS OR APPLICATIONS

| | | | |
|---|---|---|---|
| 895,249 | 5/1962 | Great Britain | 96/91 R |
| 895,250 | 5/1962 | Great Britain | 96/91 R |
| 415,081 | 8/1934 | Great Britain | 96/91 R |

OTHER PUBLICATIONS

Dinaburg, M. S., "Photosensitive Diazo Compounds," The Focal Library, 1964, P. 50–51.

*Primary Examiner*—Charles L. Bowers, Jr.
*Attorney*—Burgess, Ryan & Wayne

[57] ABSTRACT

A light sensitive two-component diazotype material (sensitive sheet) is provided containing a dicarboxylic acid or an alkyl ester thereof as a developing-accelerator together with a diazotype sensitive composition (i.e., diazo compound and coupler) in the sensitive layer in order to accelerate the rate of development of the diazotype sensitive composition following exposure to light.

10 Claims, No Drawings

LIGHT SENSITIVE TWO-COMPONENT DIAZOTYPE MATERIAL

This application is a continuation-in-part of copending U.S. Pat. application Ser. No. 777,494 filed Nov. 20, 1968 and now abandoned.

BACKGROUND OF THE INVENTION

1. Field of the invention

The present invention is concerned with a light sensitive two-component diazotype material (such as a sensitive sheet), which contains a dicarboxylic acid or a methyl- or an ethyl ester thereof together with a diazotype sensitive composition (ammonia developing diazotype composition, i.e., diazo compound and coupler) in the sensitive layer.

2. Description of the prior art

In case of developing in ammonia vapor, after exposing to the mercury lamp, the light sensitive two-component diazotype material (hereinafter occasionally referred to as a sensitive sheet) containing sensitive composition (i.e., diazo compound and coupler) in the sensitive layer, a developing accelerator such as a thiourea derivative is usually employed together with said sensitive composition for the purpose of accelerating the development of the sensitive sheet. For example, 1-allyl-3-$\beta$-hydroxyethyl-2-thiourea has been disclosed in U.S. Pat. No. 2,755,185 and is commonly used as a developing accelerator.

It is well known, however, that the accelerating ability of said thiourea derivative is not good enough and said thiourea derivative results in precoupling to the sensitive sheet during storage for a long time. On the other hand, alcohols such as ethylene glycol and dipropylene glycol may be also used as developing accelerators, sub they have the shortcomings similar to that of the aforesaid thiourea derivative.

It is, therefore, an object of the present invention to provide an improved light sensitive two-component diazotype material (sensitive sheet) containing an excellent developing accelerator.

SUMMARY OF THE INVENTION

The present invention is concerned with a light sensitive two-component diazotype material (sensitive sheet) containing a dicarboxylic acid or a methyl- or an ethyl ester thereof as a developing accelerator together with a diazotype sensitive composition (i.e., diazo compound and coupler) in the sensitive layer in order to accelerate the rate of developement of said diazotype sensitive composition in ammonia vapor after exposure thereof to the light.

It is recognized in the art that light sensitive two-component diazotype materials are those in which a substrate (i.e., sheet or paper) is coated with the diazotype sensitive composition comprising a sensitive diazonium compound and a coupling component (coupler). Such a sheet is processed by overlaying it upon the original carrying a desired image, exposing it to the light (mercury lamp) and then treating (developing) said exposed sheet in ammonia vapor. By such treatment, the undecomposed diazonium compound (which has not been exposed to the light) couples with the coupler to produce the desired dye image.

The exposure and development (i.e., printing treatment) are usually effected in the same machine containing a light source and an ammonia developing chamber. As the printing rate is often restricted by the developing rate in the ammonia chamber, it is desired to accelerate the developing rate in ammonia vapor in order to increase the printing rate. I have found an excellent developing accelerator, which does not produce precoupling between the diazonium compounds and couplers during storage even after an extended period of time, and accelerates the development in ammonia vapor.

According to the present invention, the developing accelerator is a compound having the general formula $$ROOC(CH_2)_nCOOR'$$

(wherein R and R′ are H, a methyl or an ethyl radical and may be either the same or different, and n is an integer of 3 or 5). Illustrative compounds include:

| Compound | Formula | Melting Point or Boiling Point |
|---|---|---|
| a. glutaric acid | $HOOC(CH_2)_3COOH$ | m.p. 97°–98°C |
| b. monomethyl ester of glutaric acid | $HOOC(CH_2)_3COOCH_3$ | b.p. 150°–150°C/ 10 mmHg |
| c. dimethyl ester of glutaric acid | $CH_3OOC(CH_2)_3COOCH_3$ | b.p. 84°–85°C/ 3mmHg |
| d. monoethyl ester of glutaric acid | $HOOC(CH_2)_3COOC_2H_5$ | b.p. 143°–145°C/ 7mmHg |
| e. diethyl ester of glutaric acid | $C_2H_5OOC(CH_2)_3COOC_2H_5$ | b.p. 103°–104°C/ 7mmHg |
| f. pimelic acid | $HOOC(CH_2)_5COOH$ | m.p. 104°–104°C/ |
| g. monomethyl ester of pimelic acid | $HOOC(CH_2)_5COOCH_3$ | b.p. 181°–182°C/ 17mmHg |
| h. dimethyl ester of pimelic acid | $CH_3OOC(CH_2)_5COOCH_3$ | b.p. 130°–135°C/ 17mmHg |
| i. monoethyl ester of pimelic acid | $HOOC(CH_2)_5COOC_2H_5$ | b.p. 182°–183°C/ 18mmHg |
| j. diethyl ester of pimelic acid | $C_2H_5OOC(CH_2)_5COOC_2H_5$ | b.p. 137°–141°C/ 15mmHg |

Compounds included within the above formulae in which *n* is 2, 4, 6 or 7 (i.e., succinic acid, adipic acid, suberic acid azelaic acid, and alkyl esters thereof) cannot be used in the present invention, because they have either a high melting point or a low solubility in water.

The compounds listed above when used as a developing accelerator provide an accelerating effect in the fused (molten) state. Since the development in ammonia vapor is carried out at a temperature of 100° – 120° C, compounds having a melting point below 120° C are preferred. According to the present invention, said preferred compounds (alone or in a mixture) are in an amount varying from 1 – 5 percent by weight based on the water in the sensitive solution, and may be used advantageously together with conventional development accelerators.

Diazo compounds used in the present invention are those derived from N,N-diethyl-p-phenylenediamine, N-ethyl-N-$\beta$-hydroxyethyl-p-phenylenediamine, N,N-bis ($\beta$-hydroxyethyl)-p-phenylenediamine, N,N-diethyl-2-ethoxy-p-phenylenediamine, N,N-diethyl-3-chloro-p-phenylenediamine, and the like.

Illustrative couplers (coupling components) used in the present invention are sodium 2,3-dihydroxynaphthalene-6-sulfonate, 2,3-dihydroxynaphthalene, 7-hydroxy-1,2-naphthoimidazole, 1-biguanide-7naphthol and others.

DESCRIPTION OF THE PREFERRED EMBODIMENTS

The present invention is further illustrated by the following non-limitative examples.

EXAMPLE 1

A sensitive solution is prepared by mixing the following components:

| | |
|---|---|
| water | 100cc |
| tartaric acid | 2g |
| $ZnCl_2$ | 5g |
| thiourea | 2g |
| glutaric acid | 1.5g |
| sodium 2,3-dihydroxy-naphthalene-6-sulphonate | 3g |
| p-diazo-N-ethyl-N-β hydroxyethylaniline 1/2$ZnCl_2$ | 1g |
| saponin | 0.1g |

The sensitive solution thus prepared was coated onto the surface of a white sheet (or paper) and the sheet was dried. The sensitive sheet thus obtained was overlaid closely on the original carrying a desired image, exposed to a mercury lamp and subjected to development in ammonia vapor. There was obtained a beautiful "Blueprint" carrying a desired image.

The developing percentage of the sheet in this example was 92.3 percent while the developing percentage of a sheet wherein glutaric acid was not employed was 83.1 percent. The definition of the developing percentage is described as follows: Preparation of the test-sheet:

A non-exposed sensitive sheet is left for 24 hrs. in a red bottle, which is kept at a temperature of 20° C and a relative humidity of 50 percent, to adjust the water content in the sheet.

Original: Tracing paper weighing 70 gr/m², and carrying an image (characters, figures or patterns).

The prepared test-sheet is overlaid upon the original and passed through a copying machine (trade name: RECOPY Model OM II, made by Ricoh Co., Ltd.).

"A" is the density of the dye image which is obtained, when the passing rate is 2.5m/min. "B" is the maximum density of the dye image, when the passing rate is 1 m/min. The developing percentage = A/B × 100

EXAMPLE 2

A sensitive solution was prepared by using 2.0g of the diethyl ester of glutaric acid as a substitute for glutaric acid in Example 1.

The sensitive sheet prepared by employing a sensitive solution using the same procedure as that described in Example 1 had a developing percentage of 90.8 percent.

EXAMPLE 3

A sensitive solution was prepared by mixing the following components:

| | |
|---|---|
| water | 100cc |
| tartaric acid | 2g |
| $ZnCl_2$ | 5g |
| thiourea | 2g |
| pimelic acid | 2g |
| sodium 2,3-dihydroxynaphthalene -6-sulfonate | 3g |
| p-diazo-N,N-diethylaniline 1/2$ZnCl_2$ | 1.5g |
| saponin | 0.1g |

The sensitive sheet prepared by employing the above sensitive solution using the same procedure as that described in Example 1, had a developing percentage of 91.5 percent.

EXAMPLE 4

A sensitive solution prepared by using 2.0g of the monomethyl ester of pimelic acid as a substitute for the pimelic acid in Example 3 gave the same effect as that obtained in Example 3.

EXAMPLE 5

A sensitive solution was prepared by using 2.5g of the dimethyl ester of pimelic acid as a substitute for pimelic acid in Example 3.

The sensitive sheet prepared by using said sensitive solution had a developing percentage of 89.5 percent.

To show the superiority of the present compositions as compared with typical compositions disclosed in the prior art, a series of comparative tests were carried out in the following manner:

1. Preparation of two-component diazotype light sensitive materials (A–F):

a. A two-component diazotype light sensitive material (A) was prepared by the procedure of Example 1 supra, b. A two-component diazotype light sensitive material (B) was prepared by the same procedure as that of (a) except that glutaric acid is not used.

c. A two-component diazotype light sensitive material (C) was prepared by the same procedure as that of (a) supra, except that tartaric acid is not used.

d. A two-component diazotype light sensitive material (D) was prepared by the same procedure as that of Example 3 of the present application except that citric acid is used in place of tartaric acid.

e. A two-component diazotype light sensitive material (E) was prepared by the same procedure as that of (d) except that pimelic acid is not used.

f. A two-component diazotype light sensitive material (F) was prepared by the same procedure as that of (d) except that citric acid is not used.

The ingredients of the light sensitive solution for the above-mentioned materials (A) – (F) are shown in the following table:

| | | A | B | C |
|---|---|---|---|---|
| water | 100 cc | 0 | 0 | 0 |
| tartaric acid | 2 g | 0 | 0 | — |
| $ZnCl_2$ | 5 g | 0 | 0 | 0 |
| thiourea | 2 g | 0 | 0 | 0 |
| glutaric acid | 1.5 g | 0 | — | 0 |
| sodium 2,3-dihydroxy-naphthalene-6 sulfonate | | 0 | 0 | 0 |
| p-diazo-N-ethyl-N -hydroxyethylaniline ½$ZnCl_2$ | | 0 | 0 | 0 |
| saponin | | 0 | 0 | 0 |
| | | D | E | F |
| water | 100 cc | 0 | 0 | 0 |
| citric acid | 2 g | 0 | 0 | — |
| $ZnCl_2$ | 5 g | 0 | 0 | 0 |
| thiourea | 2 g | 0 | 0 | 0 |
| pimelic acid | 2 g | 0 | — | 0 |
| sodium 2,3-dihydroxy-naphthalene-6 sulfonate | | 0 | 0 | 0 |
| p-diazo-N,N-diethylaniline ½$ZnCl_2$ | | 0 | 0 | 0 |
| saponin | | 0 | 0 | 0 |

2. Test method:

a. Comparison of developing rates

The developing percentages of the light sensitive materials were obtained as follows:

i. The non-exposed light sensitive materials (A–F) were left for 24 hours in a red bottle which was kept at a temperature of 20° C and a relative humidity of 50 percent to adjust the water-content in the sheet of the material.

ii. Each of said light sensitive materials was divided into two parts.

iii. One part was subjected to reproduction by the procedure consisting of the steps of: overlaying it upon an original carrying an image (characters, figures and patterns), exposing it to a luminescent lamp of 500 watts for 3 seconds, and developing it in ammonia vapor by passing through a copying machine (trademark: RECOPY Model OM II, made by Ricoh Co., Ltd.) at a rate of 2.5 m/min.

iv. The density of the image formed on the surface of the light sensitive materials was measured using the "Macbeth densitometer RD–400" manufactured by the Macbeth Co. Thus, the density (A) was obtained.

v. The other part was subjected to reproduction by the same procedure as that of (iii) supra except that the exposed material was developed in an ammonia vapor by passing it through the copying machine at a low rate (2 m/min) to give the maximum density of the image and then the maximum density of the image was measured by the same manner as that of said (iv). Thus, the density (B) was obtained.

vi. Developing percentage was obtained as follows:

$$\text{Developing percentage} = [A]/[B] \times 100$$

b. Comparison of preservability of the light sensitive material (i) Each of the light sensitive materials (A–F) was divided into two parts.

ii. One part was immediately subjected to reproduction by the procedure described in (a — (iii) supra. The other part was subjected to reproduction after 24 hours artificial aging in an atmosphere of 50° C and a relative humidity of 50 percent.

iii. Then, the densities of the images formed on the surface of each of said light sensitive materials and the non-image areas thereof were respectively measured by the same manner as that set out in (a)—(iv) supra.

3. Results:

a. Results according to Test method (a):

| | A | B | C | D | E | F |
|---|---|---|---|---|---|---|
| developing percentage (%) | 92.3 | 83.1 | 96.0 | 91.0 | 81.3 | 95.5 |

b. Results according to Test method (b):

| | | A | B | C | D | E | F |
|---|---|---|---|---|---|---|---|
| density of the image area | artificial aging: non | 1.24 | 1.15 | 1.30 | 1.28 | 1.19 | 1.31 |
| | do. 24 hours | 1.18 | 1.10 | 1.19 | 1.20 | 1.14 | 1.25 |
| density of the non-image area | artificial aging: non | 0.11 | 0.11 | 0.11 | 0.10 | 0.10 | 0.10 |
| | do. 24 hours | 0.16 | 0.15 | 0.34 | 0.16 | 0.16 | 0.35 |

4. Analysis:

In the two-component diazotype light sensitive material susceptible to development in ammonia vapor, the light sensitive materials B or E containing tartaric acid or citric acid and not containing glutaric acid or pimelic acid were characterized by high preservability and low developing rate. On the other hand, the light sensitive materials C or F which did not contain tartaric acid or citric acid but did contain glutaric acid or pimelic acid had a high developing rate and low preservability.

The above results indicate that the light sensitive materials A or D of the present invention, which contain both an acidic stabilizer (tartaric acid or citric acid) and a developing-accelerator (glutaric acid or pimelic acid), were characterized by high preservability and high developing rate.

What is claimed is:

1. In a two-component diazotype light sensitive composition containing a diazonium compound, a coupler therefor and a stabilizer, the improvement which comprises incorporating in said two-component composition at least about 1–5 percent by weight as based on the weight of water in the light-sensitive coating solution of said composition, of one developing-accelerator dicarboxylic acid compound having the general formula:

$$ROOC(CH_2)_nCOOR'$$

wherein R and R' may be the same or different and are selected from the group consisting of hydrogen, methyl and ethyl, and *n* is an integer of 3 or 5, and wherein, in said composition, said stabilizer is citric acid or tartaric acid.

2. A two-component composition, according to claim 1 wherein the developing-accelerator compound is selected from the group consisting of, glutaric acid, pimelic acid and the methyl and ethyl esters thereof.

3. A two-component composition according to claim 1 wherein the developing-accelerator compound is glutaric acid or pimelic acid.

4. A two-component composition according to claim 1 wherein the developing-accelerator compound is a mono-methyl or diethyl ester of glutaric or pimelic acid.

5. A two-component composition according to claim 1 wherein the developing accelerator compound is the dimethyl ester of glutaric acid or the diethyl ester of glutaric acid.

6. In a two-component diazotype light-sensitive material susceptible to development in ammonia vapor at a temperature of about 100° C to about 120° C containing a substrate having on the surface thereof a light-sensitive layer containing a diazo compound, a coupler thererfor and an acidic stabilizer, the improvement comprising including as a developing accelerator, at least about 1–5 percent by weight, as based on the weight of water in the light-sensitive coating solution for said layer, of one compound of the formula $$ROOC(CH_2)_nCOOR'$$

wherein R and R' may be the same or different and are selected from the group consisting of hydrogen, methyl, and ethyl and *n* is an integer of 3 or 5, and wherein, in said composition, said stabilizer is citric acid or tartaric acid.

7. A two-component diazotype light-sensitive material according to claim 6 wherein the developing accelerator compound is selected from the group consisting of glutaric acid, pimelic acid and the methyl and ethyl esters thereof.

8. A two-component diazotype light-sensitive material according to claim 6 wherein the developing-accelerator compound is glutaric acid or pimelic acid.

9. A two-component diazotype light-sensitive material according to claim 6 wherein the developing-accelerator compound is a mono-methyl or diethyl ester of glutaric acid or pimelic acid.

10. A two-component diazotype light-sensitive material according to claim 6 wherein the developing accelerator compound is the dimethyl ester of glutaric acid or the diethyl ester of glutaric acid.

* * * * *